_United States Patent_ [19]

Romig

[11] Patent Number: 4,860,870
[45] Date of Patent: Aug. 29, 1989

[54] CLUTCH CONTROL MECHANISM

[75] Inventor: Kenneth L. Romig, Rochester, Mich.

[73] Assignee: General Motors Corporation, Detroit, Mich.

[21] Appl. No.: 208,446

[22] Filed: Jun. 20, 1988

[51] Int. Cl.⁴ ............................................. F16D 23/00
[52] U.S. Cl. ................................ 192/99 S; 192/111 B
[58] Field of Search ................ 192/99 S, 99 R, 70.27, 192/85 C, 111 B

[56] References Cited

U.S. PATENT DOCUMENTS

| 1,552,368 | 9/1925  | Whitacre       | 192/99 S |
| 3,213,990 | 10/1965 | Gorelov et al. | 192/99 S |
| 3,983,983 | 10/1976 | Steiskal et al.| 192/99 S |
| 4,560,052 | 12/1985 | Renaud .       |          |

FOREIGN PATENT DOCUMENTS

| 242706  | 1/1963  | Australia ............................ 192/99 S |
| 1922913 | 11/1970 | Fed. Rep. of Germany .... 192/99 S |
| 2177772 | 1/1987  | United Kingdom .............. 192/99 S |

Primary Examiner—Kenneth J. Dorner
Assistant Examiner—Brian K. Green
Attorney, Agent, or Firm—Donald F. Scherer

[57] ABSTRACT

A clutch control mechanism has a fork member that is mounted for rolling action during pivoting at a fulcrum on transaxle transmissions. The mounting structure on the case includes a T-shaped member that is rotatably mounted on a stud member secured to the transmission case. The fork has a longitudinal mounting slot prependicular to the transverse pivot axis to facilitate assembly with an engine.

1 Claim, 2 Drawing Sheets

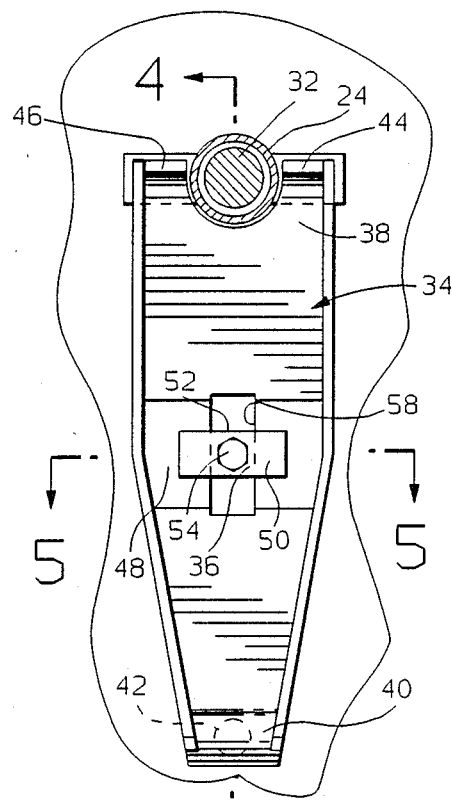
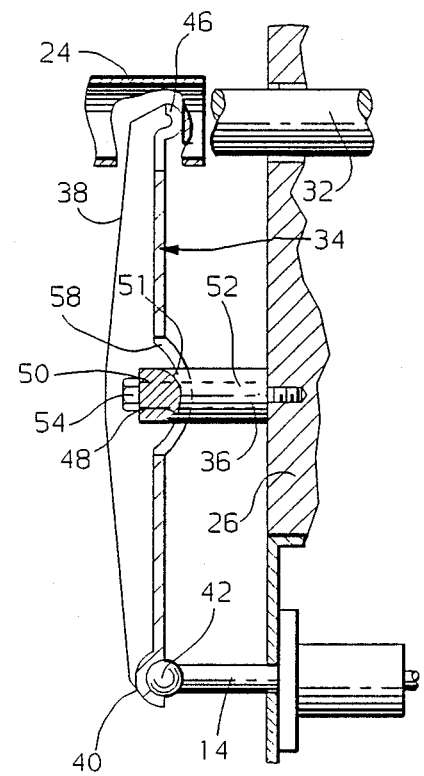
FIG. 3
FIG. 4
FIG. 5

CLUTCH CONTROL MECHANISM

BACKGROUND OF THE INVENTION

This invention relates to mechanically operated clutch assemblies and more particularly to the structure of the control fork and fork mounting for mechanically operated clutch assemblies in transaxle transmissions.

SUMMARY OF THE INVENTION

It is an object of this invention to provide an improved clutch fork lever assembly wherein a cast, composite or stamped metal fork member has an operator portion, a clutch actuating portion and a fulcrum portion, and wherein the fork member is pivotally mounted at the fulcrum portion on a rotatable support which permits rotation about an axis through the fulcrum for alignment of the clutch actuating portion on the clutch throwout bearing.

It is another object of this invention to provide an improved clutch control lever assembly for a transaxle wherein a clutch fork has a predetermined diameter mounting groove pivotally mounted on a T-bar having a small diameter mating surface at the lever fulcrum, and wherein an aperture is formed in the lever perpendicular to and intersecting the mounting groove to permit disassembly of the transaxle from the engine.

It is a further object of this invention to provide an improved clutch lever mounting structure wherein a mounting stud has a first predetermined cylindrical surface which mates with a larger cylindrical surface in the clutch lever and wherein the cylindrical surfaces promote rolling or cardonic action between the lever and the mounting stud.

These and other objects and advantages of the present invention will be more readily apparent from the following specification and drawings.

DESCRIPTION OF THE DRAWINGS

FIG. 3 is an elevational plan view of a clutch lever which can be used in the environment of FIG. 2.

FIG. 4 is a view taken along line 4—4 of 3.

FIG. 5 is a view taken along line 5—5 of FIG. 3.

DESCRIPTION OF THE EMBODIMENTS

Figure 1:
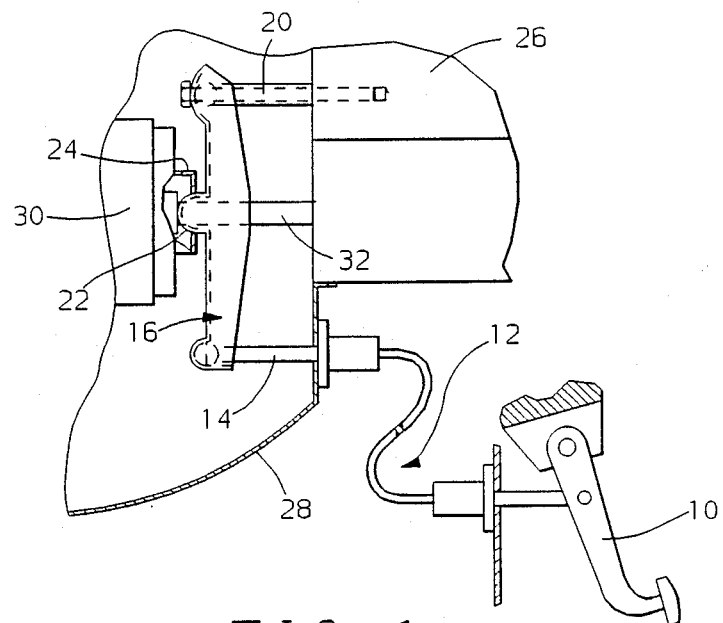
FIG. 1 is a diagrammatic view of a clutch operating environment incorporating the present invention.

Referring to the drawings, wherein like characters represent the same or corresponding parts throughout the several views, there is seen in FIG. 1 a transmission clutch control structure incorporating an operator pedal 10, a hydraulic transfer mechanism 12, an operator input rod 14, a clutch fork or lever 16 and a clutch fork support mechanism 20. The clutch fork 16 has a clutch control portion 2 which abuts a conventional throwout or release bearing 24 which, in turn, operates a conventional disc clutch mechanism in a well known manner.

The operator pedal 10 and hydraulic transfer mechanism 12 are conventional items and their operation is well known. Items performing these functions are readily available and in commercial use in some countershaft transmission mechanisms.

The clutch fork support 20 is secured to a transmission casing 26 which supports a clutch or bell housing 28 in which a conventional clutch mechanism 30 is disposed. The transmission casing houses a conventional countershaft type transmission and includes a transmission shaft 32 which provides a drive connection from the clutch 30 to a conventional gearing arrangement, not shown, disposed in the transmission casing.

Figure 2:
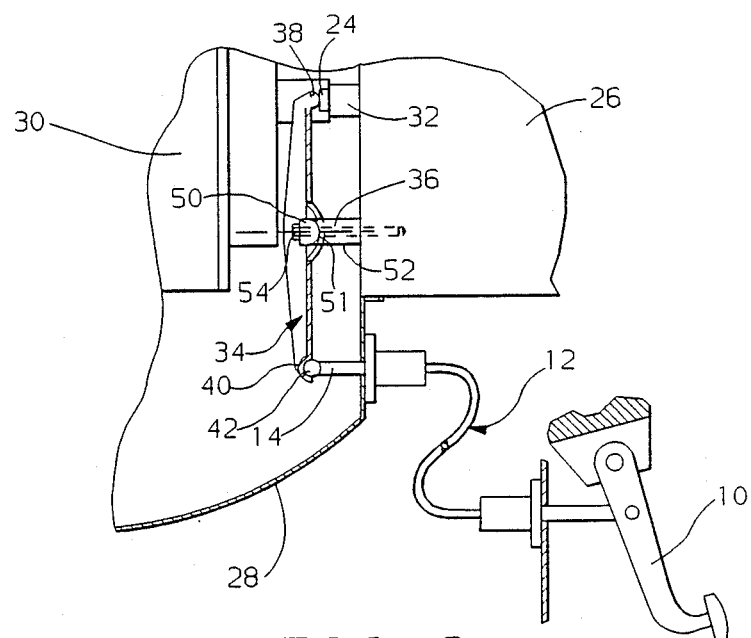
FIG. 2 is another clutch operating environment incorporating the present invention.

The environment shown in FIG. 2 utilizes a clutch operator pedal 10, a hydraulic transfer mechanism 12 and an operator input member 14. Also seen in FIG. 2 is a conventional transmission casing 26 and clutch housing 28. The transmission casing 26 supports a transmission input shaft 32 which is operatively connected with a conventional clutch 30. A conventional throwout bearing 24 is disposed for enforcing engagement and disengagement of the clutch 30 in response to pivoting of a clutch fork or lever 34 which is mounted on a clutch support 36 for substantially rolling contact.

In FIG. 1, the clutch fork 16 is operative to move (puch) the throwout bearing 24 leftward when clutch disengagement is desired. The mechanism shown in FIG. 2 has the clutch fork 34 disposed on the support 36 such that the throwout bearing 24 will be moved (pulled) rightward to effect clutch disengagement. These push and pull type clutch controls are well known and have been used in various countershaft type transmissions.

The clutch forks 16 and 34 differ in that the fulcrum for clutch fork 34 is disposed between the operator input 14 and a clutch control portion 38, while the clutch fork 16 has the fulcrum disposed at a distal end thereof with the clutch control 22 being positioned between the fulcrum and the operator input 14. The basic structure of the clutch levers 16 and 34 is, however, the same in that both fulcrum points have a groove portion which accommodates a member of the respective mounting supports 36 and 20.

FIGS. 3, 4 and 5 depict a clutch fork 34 which is substantially the same as that shown in FIG. 2. As seen in FIG. 4, the clutch fork 34 has a transversely disposed semi-circular groove portion 40 adapted to position a spherical surface 42 formed on the operator input 14. The clutch fork 34 also has a pair of transversely disposed substantially semi-cylindrical portions 44 and 46 which engage a portion of the throwout bearing 24 on opposite sides of the transmission shaft 32.

The fork 34 has a transversely disposed substantially semi-cylindrical fulcrum portion 48 in which is disposed a cross member 50 of a T-bar mounting support 52. The cross member 50 has a substantially cylindrical surface 51 which is preferably one-half the diameter of cylindrical fulcrum 48. It can also be seen in FIG. 5 that the T-bar 52 is secured to the transmission casing 26 by a threaded fastener, such as a bolt 54. The bolt 54 includes a shoulder portion 56 which abuts the transmission casing 26 so that the T-bar 52 will not be held immovably against the transmission casing 26. In other words, with the fastener 54 fully threaded into the transmission casing 26, the T-bar 52 will be permitted to rotate about the longitudinal axis of the threaded fastener 54. In the alternative, the shoulder 56 can be omitted so that the T-bar 52 is held securely to the transmission casing 26.

In most transmission installations, the throwout bearing 24 does not align precisely on the transmission shaft 32. During clutch engagement and disengagement, the clutch bearing 24 attempts to align itself with the rotating center of the clutch. When this occurs, it is necessary for the bearing 24 to move relative to the shaft 32. This movement can result in forces which attempt to rotate the fork 34 about the fulcrum point defined by the T-bar 52. With the present invention, this alignment process occurs without placing any undue forces on the shaft fork 34 or throwout bearing 24, because the assembly is permitted to rotate along with the T-bar 52 about the threaded fastener 54 when the shoulder 56 is present on the fastener 54. Any slight misalignment which occurs during assembly and/or during operation of the transmission is accommodated by the structure of this invention.

When the fastener 54 is secured to the case 26 for nonrotation, the width of the lever 34 at the fulcrum permits the self-alignment between the components. Thus, in either instance, excess misalignment forces are removed from the system while the rolling or cardonic action between the clutch fork and mounting stud are maintained. This rolling action promotes efficiency in the clutch system and reduces the operator force necessary for clutch disengagement. In the alternative, an increase in clutch apply force can be obtained for a given operator force.

When the clutch assembly is assembled to the engine assembly, the pull clutch, FIG. 1, has a release bearing retaining ring as part of the clutch assembly. This is a conventional mechanism. The clutch release bearing 24 is assembled to the transmission and the clutch fork lever 34 is assembled between the bearing flanges and lined up with the bolt 54 hole in the housing 26. The T-bar 52 is then assembled through the slot 58 in the fork lever 34 with the bolt 54. The transmission can now be assembled to the engine.

After engine to transmission assembly, the pull clutch release bearing must be seated in a release bearing retaining ring, not shown. This is accomplished by pulling the fork lever 34 away from the engine at the slave cylinder end 40. For a push clutch, this bearing retaining procedure is not required since the bearing does not require retention to the clutch assembly.

For removal of the pull clutch assembly or transmission from the engine assembly, the following procedure is required. Pull the clutch fork lever 34 off the release bearing 24. Lever 34 is pulled perpendicular to the transmission centerline until the inboard edge of the slot 58 contacts the inboard surface of the T-bar 50. Once the fork lever clears the release bearing flanges, the transmission can be removed normally from the engine. After transmission removal, the primary part of the release bearing 24 can be removed from the clutch assembly release bearing retaining ring and assembled to the transmission quill per above. An opening, not shown, is provided in the clutch housing 28 for the purpose of permitting removal of the clutch fork lever from the release bearing 24. This opening is generally aligned with the vertical plane of the clutch fork 16 or 34.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A clutch fork lever assembly for a transaxle comprising: a housing; operator controlled portion means for receiving input forces from an operator; clutch control portion means for manipulating a clutch release bearing means in response to forces at said operator controlled portion; fulcrum portion means including a transverse groove portion having a substantially cylindrical surface for providing a pivot area for said clutch fork lever; support means for pivotally supporting said clutch fork lever at said fulcrum portion means and including mounting member portion means including a bar member having a substantially cylindrical surface alignable in said transverse groove portion, said cylindrical surfaces being disposed in mating relation and of sufficiently different diametral dimensions to promote rolling contact during pivoting of said clutch fork lever; and a longitudinally extending slot in said fulcrum portion means intersecting said transverse groove and having a sufficient width to permit passage of said bar member during assembly and disassembly of said transaxle to an engine.

* * * * *